No. 850,143. PATENTED APR. 16, 1907.
J. R. DONNELLY.
COOKING UTENSIL.
APPLICATION FILED NOV. 10, 1904. RENEWED JULY 7, 1905.

Witnesses
J. Mason Mangham.
J. Mae Wright.

Inventor
John R. Donnelly
by S. W. Bates
Attorney

UNITED STATES PATENT OFFICE.

JOHN R. DONNELLY, OF FAIRFIELD, MAINE.

COOKING UTENSIL.

No. 850,143.

Specification of Letters Patent.

Patented April 16, 1907.

Application filed November 10, 1904. Renewed July 7, 1905. Serial No. 268,736.

*To all whom it may concern:*

Be it known that I, JOHN R. DONNELLY, a citizen of the United States, residing at Fairfield, in the county of Somerset and State of Maine, have invented certain new and useful Improvements in Cooking Utensils, of which the following is a specification.

My invention relates to a cooking utensil of that class which is provided with insulated walls; and the object of the invention is to construct such a utensil in such a manner that it can be quickly and easily put together and so that the cover and the body portion will form a tight joint when put together.

I illustrate my invention by means of the accompanying drawings, in which—

Figure 1:
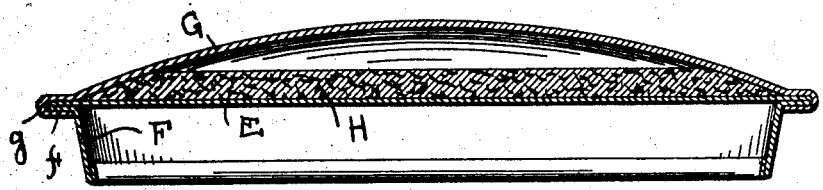
Figure 2:
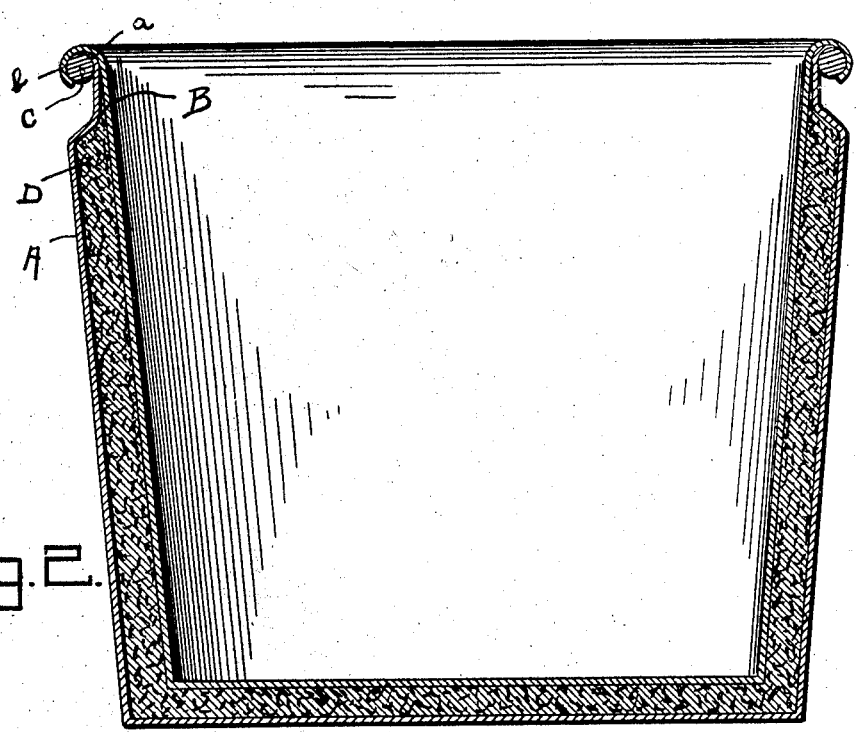
Figure 3:

Figure 1 is a central vertical section through the cover. Fig. 2 is a central vertical section through the dish. Fig. 3 is a top plan view thereof.

These dishes are designed to be used for baking beans, pudding, and other things of like nature which require to be slowly cooked and are placed in the oven where the heat slowly passes through the insulated walls and gradually cooks the contents. It is important to so unite the inner and outer shells of which the parts are made so that they will be practically water-tight and also so that the cover will fit tight and the edge of the body portion will be stiff and round. It is also important to adopt a construction which may be cheaply made by machinery.

My cooking-dish is composed of a body portion made double with a layer of asbestos paper or felt between them and a cover constructed in a similar manner. It has an outer shell A, preferably tapering downward somewhat, and an inner shell B, fitting over the outer shell, with a space between them, which is filled with a layer D of asbestos in the form of paper or felt. I connect these two shells at the top by drawing and bending the edge *a* of the outer shell inward and upward by a suitable rolling-machine, forming thereby an annular recess into which is slipped the wire ring C. The wire ring and the upper edge of the shell A are held in place and upper edge of the dish completed by turning outward the upper edge *b* of the inner shell over the edge of the outer shell and the hoop and rolling it firmly down to form a bead.

A tight-fitting insulated cover is provided for fitting the open end of the dish and is formed of a lower disk E, having a tapering sheet-metal ring F resting against its under side, an outward-extending flange *f* being formed on the ring for this purpose. An upper disk G, of greater diameter than the lower disk, is placed on top of the lower disk, with a layer of asbestos H inserted between the two disks. The outer edge *g* of the upper disk is now turned downward and inward, binding firmly the flange *f* and the edge of the lower disk, and so finishing off the cover. The smooth and flush inner surface of the inner shell where it passes over the wire allows the tapering ring F to fit closely and make a tight joint, and the whole construction is a practical and mechanically-perfect structure to put on the market.

I claim—

An insulated cooking-dish consisting of a body portion having an inner and an outer shell of sheet metal, the metal of the upper edge of the outer shell being drawn and bent inward and upward to form an annular recess, a wire hoop fitting over said edge and within said recess, the upper edge of the inner shell being folded outward and over the hoop and the edge of the outer shell and rolled down to form a tight joint, a layer of asbestos paper or felt inserted between the inner and outer shells and a cover for said dish composed of a lower sheet-metal disk, a tapering hoop having an outward-extending annular flange resting against the under side of said disk, an upper disk, the outer edge of which is turned over the edge of the lower disk and the flange of said tapering ring to hold them in place and a sheet of asbestos paper or felt held between said disks.

In testimony whereof I affix my signature in presence of two witnesses.

JOHN R. DONNELLY.

Witnesses:
S. W. BATES,
J. MAE WRIGHT.